United States Patent Office 3,814,720
Patented June 4, 1974

---

3,814,720
PROCESS FOR PREPARING A NONAQUEOUS DISPERSION OF THERMOSETTING FILM-FORMING COPOLYMER
David L. Maker and Stephen C. Peng, Rochester, and Arend W. D. Vos, Birmingham, Mich., assignors to Ford Motor Company, Dearborn, Mich.
No Drawing. Filed Mar. 1, 1971, Ser. No. 120,044
Int. Cl. C08g 51/28, 51/32, 53/18
U.S. Cl. 260—33.4 R            9 Claims

ABSTRACT OF THE DISCLOSURE

An active ethenic monomer having a functional epoxy, hydroxy or amide group is copolymerized with another active ethenic monomer in the presence of an alkylated methylolated copolymer of acrylamide or methacrylamide and another ethenic monomer dissolved in a nonaqueous medium. The nonaqueous medium is a miscible mixture of an aromatic or alcoholic solvent for the methylolated copolymer and an aliphatic nonsolvent for the other copolymer. The reaction produces a stable dispersion of a polymeric material that is insoluble in the nonaqueous medium. Curing coatings of the dispersions produces thermosetting films having an excellent combination of protective and decorative properties.

SUMMARY OF THE INVENTION

This application relates to the subject matter of U.S. patent application Maker et al. Ser. No. 82,130, filed Oct. 19, 1970, and now abandoned in favor of a Continuation-In-Part Application Ser. No. 240,789, filed Apr. 3, 1972, both entitled "Nonaqueous Dispersions of Thermosetting Film Forming Polymers," and U.S. patent application Maker et al. Ser. No. 120,045, entitled "Nonaqueous Dispersions of Thermosetting Film Forming Copolymers of Ethenic Monomers," filed Mar. 1, 1971.

Nonaqueous dispersions of film forming polymers have been developed in recent years in attempts to improve the efficiency of applying protective or decorative coatings to a variety of objects such as vehicle bodies and other vehicle components. Such dispersions can carry a greater percentage of solids than the previously used solutions and thus reduce the amount of lost volatiles. The dispersions also reduce the number of coats necessary to obtain desired film thicknesses.

Preparing nonaqueous dispersions capable of producing thermosetting films is a difficult task, however. An alkylated melamine-formaldehyde resin having a high mineral spirits tolerance has been an essential ingredient of such dispersions, and it can be difficult to achieve satisfactory uniformity of such resins in economical mass production. Moreover, the high degree of alkylation required to obtain the desired mineral spirits tolerance necessitates longer curing times or higher curing temperatures. Prior art dispersions typically require block or graft copolymers that provide dispersion stability but diminish final film properties.

This invention provides a nonaqueous dispersion of a thermosetting film forming polymer that utilizes a methylolated addition copolymer of an ethenic monomer and an amide of an unsaturated acid and does not require the highly alkylated amino resins. Preparation of the methylolated addition copolymer is more manageable and better suited to mass production techniques even in those situations where some alkylation is necessary. The copolymer is more uniform and produces final films of better overall quality.

Dispersion preparation usually begins by preparing a solution of the methylolated addition copolymer in a suitable solvent, which preferably is an aromatic liquid such as xylene, benzenes, toluene, etc., or an alcohol such as butanol, propanol, isopropanol, isobutanol, ethanol, hexanol, etc. A miscible aliphatic liquid that is a nonsolvent for the second addition copolymer is added to the solution and an active ethenic monomer having an epoxy hydroxy or amide functional group is copolymerized in the resulting mixture with an active ethenic monomer free of such functional groups to form the second addition copolymer that is insoluble in and dispersed uniformly through the liquid medium. Sufficient aliphatic nonsolvent must be added to insure that the second addition copolymer is insoluble in the resulting liquid medium, which is made up of the solvent and the nonsolvent. The methylolated copolymer associates in some unknown manner with the dispersed particles of the second addition copolymer to form a stable dispersion. It is believed the association is a physical attraction although some chemical binding or electrical attraction might occur.

Clear, protective, thermoset films can be produced directly from the dispersions. Such films can be made entirely of acrylic components if desired. Pigments can be added to enhance the decorative nature of the films. Solutions of alkylated amino resins having a more conventional mineral spirits tolerance can be added to the dispersions to achieve special properties.

The aliphatic nonsolvent liquid makes up the major portion of the liquid medium, which consists of the solvent and the nonsolvent, and preferably forms as close to 100 percent thereof as is practical without expending unnecessary time and effort to eliminate the aromatic or alcoholic liquids. Liquid mediums containing 90 weight percent aliphatic nonsolvent are relatively easy to obtain and provide good results. Suitable aliphatic nonsolvents include aliphatic distillation products such as naphthas. Aliphatic naphthas having distillation ranges above 85° C. are most practical and naphthas having a distillation range within about 100–150° C. are preferred because of rapid polymerization rates at refluxing temperatures that provide automatic temperature control. Cyclohexane, cycloheptane, cyclooctane, n-octane, isooctane, nonane and other straight, branched or cyclic aliphatic hydrocarbons or mixtures also can be used.

Useful amides of unsaturated acids include acrylamide, methacrylamide, crotonamide, the mono and di amides of maleic acid and fumaric acid, and the monoamide-monoester of maleic and fumaric acid. Acrylamide and methacrylamide form highly stable dispersions that cure readily into economical final films and are preferred. Amides of alpha-beta unsaturated acids cure easily but amides of other unsaturated acids can be used.

Ethenic monomers useful in making the copolymer preferably include monomers having about 11 to 22 carbon atoms such as 2-ethylhexyl acrylate, lauryl methacrylate, stearyl methacrylate, tridecyl methacrylate and the acrylates and methacrylates having inclusive numbers of carbon atoms because these monomers impart considerable inherent mineral spirits tolerance to the copolymer. The copolymer preferably has a mineral spirits tolerance at 75 percent solids in butanol of at least 1000 (ASTM D1198–55). Mixtures of the ethenic monomers with each other and with ethenic monomers having a lower number of carbon atoms can be used to achieve desired final film properties. Care should be exercised in making such mixtures to avoid decreasing the mineral spirits tolerance below the aforementioned value. Small amounts of acrylic, methacrylic, and other alpha-beta unsaturated acids can be included as built-in catalysts for final film curing, but amounts greater than 5 weight percent should be avoided. The amide preferably makes up about 10–30 weight percent of the copolymer.

Copolymerization of the amide can be carried out in the same solvent that subsequently carries the copolymer into the dispersion. Methlolation can be achieved immediately after the addition reaction by adding appropriate amounts of formaldehyde and maintaining the ingredients under reaction conditions. Best final film properties are produced by mol ratios of formaldehyde to acrylamide or methacrylamide of about 0.5–2.0. A water trap is included on the reaction apparatus to remove water produced during methylolation. When alkylation also is desired, an appropriate alkanol is used as the solvent. Alternatively, the alkanol can be added with the formaldehyde.

Active ethenic monomers useful as the nonfunctional monomer of the second copolymer are those that readily polymerize in the presence of free radical initiators such as benzoyl, dibutyl, dicapropyl, and dicaprylyl peroxide, cumene hydroperoxide, t-butyl peroctoate, etc. Such monomers preferably have an activating group near the carbon-carbon double bond. Typical activating groups are esterfied carboxyl radicals such as those found in methyl acrylate, methyl methacrylate, ethyl acrylate, ethyl methacrylate, butyl acrylate, butyl methacrylate, propyl acrylate, propyl methacrylate, 2 - ethylhexyl acrylate; chloride and acetate radicals such as those in vinyl chloride, vinylidene chloride and vinyl acetate; the other double bonds of aromatic monomers such as styrene, alpha methyl styrene and vinyl toluene; and cyano radicals such as in acrylonitrile and methacrylonitrile. Ethenic monomers having less than about 12 carbon atoms react more effectively and produce dispersions having better stability and final film properties. The methacrylic monomers usually produce similar stability with a slightly larger number of carbon atoms than acrylic monomers.

Active ethenic monomers having a functional epoxy group that are useful in the second copolymer include 2,3 - epoxypropyl methacrylate, 2,3 - epoxy-propyl acrylate, 3,4 - epoxybutyl acrylate, epoxidized cyclohexenyl-methyl methacrylate, 4 - epoxyethyl styrene, 5,6 - epoxy-hexyl acrylate, 3 - phenyl 2,3 - epoxypropyl acrylate, 3-phenyl 2,3-epoxypropyl methacrylate and other epoxy-alkyl acrylates and methacrylates. Useful active ethenic monomers having a functional hydroxy group include hydroxypropyl acrylate and methacrylate, hydroxyethyl acrylate and methacrylate, and other hydroxyalkyl esters of alpha-beta unsaturated acids. Other functional monomers such as acrylamide or methacrylamide also can be used in the second copolymer. These functional monomers preferably contain less than 12 carbon atoms for best dispersion stability. The functional monomer usually makes up about 5 to 50 weight percent of the total ethenic monomer content of the second addition copolymer. Best final film strength, adhesion and gloss are achieved when the functional monomer makes up about 10–30 weight percent of this total ethenic monomer content.

Mixtures in the second copolymer of several active ethenic monomers are used to produce a combination of final film and dispersion properties. Acrylonitrile preferably forms up to 40 weight percent of the second copolymer because its dispersions are highly stable. Acrylic, methacrylic and other alpha-beta unsaturated acids in amounts no greater than about 5 weight percent of the combined ethenic monomers can be included as built-in catalysts for final film curing. The amount of these acids preferably is kept below 3 weight percent to prevent significant participation in the dispersion forming reactions.

Polymerizations preferably are carried out with constant stirring. Temperatures above about 120° C. usually should be avoided to prevent undesirable side reactions and reactions involving the functional groups. A liquid medium having a reflux temperature close to desired polymerization temperature is preferred because of the automatic maximum temperature control provided thereby.

Dispersions of the invention can be made with solids contents up to 60 weight percent. Paints made from the dispersions have excellent shelf life and stability, and typically have solids contents (pigment and film forming ingredients) of over 40 weight percent. Automotive topcoats can be produced by spray applications from the paints having solids as high as 60 weight percent.

Final film curing takes place at temperatures of about 100–150° C. During final film curing, reactions between the methylolated or alkylated methylolated groups and the epoxy, hydroxy or amide functional groups establish a cross-linked, thermoset structure. Intermediate polymers such as melamine-formaldehyde and urea-formaldehyde resins can be incorporated into the structure if desired. Small amounts of organometallic salts can be used to catalyze final film curing reactions to achieve improvements in solvent and mar resistance and cold checking but highly satisfactory films can be produced without such salts. Useful salts include the naphthenates, octoates, acetates, tallates and neodecanoates of zinc, cobalt, copper, lead and manganese.

DETAILED DESCRIPTION

Example 1

An alkylated methylolated addition copolymer of acrylamide and an ethenic monomer is prepared in the following manner. Three hundred fifty grams of butanol is heated to refluxing in a 2 liter flask equipped with a water condenser, thermometer, stirrer and dropping funnel. A mixture of 585 grams 2-ethylhexyl acrylate (78 percent of monomers) 150 grams acrylamide (20 percent) 15 grams acrylic acid (2 percent) 375 grams butanol, 75 grams water and 10 grams tertiary butyl peroctoate is added dropwise over a three hour period while refluxing and agitating. One hour after completion of the addition, a mixture of 10 grams butanol and 5 grams tertiary butyl peroctoate is added and the reaction mixture is agitated at reflux conditions for an additional two hours. A Dean-Stark water trap containing 25 grams butanol is fitted to the apparatus and 300 grams of a mixture of 40 percent formaldehyde, 51 percent butanol and 9 percent water is added (This mixture provides about 2 moles of formaldehyde per mole of acrylamide in the reaction mixture.). Refluxing and stirring are re-established and water is removed continuously for another four hours. The resulting solution contains 44.5 weight percent solids. Approximately 750 grams of distillate are removed to produce a straw colored solution having a solids content of about 74 percent, a Gardner-Holdt viscosity of Z6+ and an acid value of 15.

A dispersion is prepared by first mixing in the apparatus 203 grams of the solution with 387 grams of an aliphatic naphtha having a distillation range of 116–146° C. The mixture is heated to refluxing and an active ethenic monomer mixture consisting of 105 grams styrene, 80.5 grams butyl methacrylate, 52.5 grams methyl methacrylate, 52.5 grams hydroxypropyl methacrylate, 52.5 grams acrylonitrile, 7 grams acrylic acid, 50 grams aliphatic naphthas having a distillation range of 116–146° C. and 3.5 grams of tertiary butyl peroctoate is added dropwise over a 5 hour period while maintaining refluxing and stirring. One hour after this addition, a mixture of 10 grams of the aliphatic naphtha and 1.5 grams tertiary butyl peroctoate is added. Refluxing is continued for an additional hour.

The product is a milky white dispersion having a solids content of 48.9 percent, a viscosity of 18 seconds in a number 4 Ford cup and an acid value of 21. The second copolymer contains about 15 percent hydroxypropyl methacrylate. Baking coatings of the dispersion without additional resins or catalysts at 130° C. for 17 minutes produces a clear, durable solvent resistant, thermoset film.

Example 2

One hundred grams of the dispersion of Example 1 is mixed with thirty-four grams of an alkylated melamine formaldehyde resin solution in a 1:1 mixture of xylene and butanol that has a solids content of 60 percent and a mineral spirits tolerance of 250–350, 1.5 grams zinc naphthenate and 20 grams of a slow evaporating solvent consisting of aliphatic and aromatic hydrocarbons. The solvent assists in coalescing the dispersion during final film curing. Drawing down the mixture and baking 17 minutes at 130° C. produces a clear, durable, solvent resistant thermoset film. The film has improved solvent and acid resistance over that of Example 1.

Example 3

Using the procedure and apparatus of Example 1, 660 grams 2-ethylhexyl acrylate, 75 grams acrylamide (10 percent of monomers) and 15 grams acrylic acid are reacted. The formaldehyde-butanol-water mixture is reduced to 150 grams. Distillation concentrates the resulting solution to a solids content of about 81 percent, a Gardner-Holdt viscosity of Z6 and an acid value of 16.3.

A dispersion is prepared by polymerizing 105 grams styrene, 35 grams methyl methacrylate, 52.5 grams butyl methacrylate, 52.5 grams acrylonitrile, 98 grams hydroxypropyl methacrylate and 7 grams acrylic acid. The product is a milky white dispersion having a solids content of 48.4 percent, a viscosity of 19.7 seconds in a number 4 Ford cup and an acid value of 20. A blend of the dispersion with 30 percent of an alkylated melamine-formaldehyde resin having a mineral spirits tolerance of 250–350 at 60 percent solids in 1:1 mixture of xylene and butanol is prepared according to Example 2. Baking a coating of the blend at 130° C. for 17 minutes produces a hard, mar resistant thermoset film.

Example 4

A mixture of 186 grams of the solution prepared in the first paragraph of Example 3 and 404 grams of aliphatic naphtha (distillation range 116–146° C.) is charged into the apparatus and raised to reflux temperature of 118° C. A second mixture composed of 105 grams of styrene, 80.5 grams butyl methacrylate, 52.5 grams methyl methacrylate, 52.5 grams acrylonitrile, 52.5 grams 2,3-epoxypropyl methacrylate, 7 grams acrylic acid, 50 grams of the aliphatic naphtha, and 3.5 grams of tertiary butyl peroctoate is added dropwise over a 4 hour period keeping the temperature at reflux. One hour after the completion of this addition, a mixture of 10 grams of the aliphatic naphtha and 1.5 grams of tertiary butyl peroctoate is added. The mixture is held at reflux temperature an additional 2 hours and the product obtained is a milky white polymer dispersion of 49 percent solids, a viscosity of 17.2 seconds (#4 Ford cup) and an acid value of 8.4. This polymer is blended with 30% of an alkylated melamine-formaldehyde resin (MST 250–350 at 60% solids in 1:1 xylene and butanol) and baked at 265° F. for 17 minutes to form a hard, mar resistant thermoset film.

Thus this invention provides a nonaqueous dispersion that uses a copolymer of an amide of unsaturated acids with an ethenic monomer as a stabilizer. The dispersions produce thermoset films highly useful as protective and decorative coatings.

We claim:

1. A process for preparing a nonaqueous dispersion of a thermosetting film-forming polymer comprising
preparing a solution of a copolymer in a solvent for said copolymer, said copolymer being a methylolated addition copolymer of an amide selected from the group consisting of acrylamide, methacrylamide, crotonamide, the mono- and di-amides of maleic acid, the mono- and di-amides of fumaric acid, the monoamide-monoester of maleic acid and the monoamidemonoester of fumaric acid and an ethenic monomer that provides the resultant copolymer with a mineral spirits tolerance at 75 percent solids in butanol of at least 1000 mixing with said solution an aliphatic liquid miscible therewith and in sufficient quantity to form the major portion of the resulting liquid medium, and copolymerizing in said mixture an active ethenic monomer having an epoxy, hydroxy or amide functional group with an active ethenic monomer free of such functional groups to form a second addition copolymer, said aliphatic liquid being a nonsolvent for said second addition copolymer, said second addition copolymer being insoluble in and dispersed through said liquid medium.

2. The process of claim 1 which preparing the methylolated addition copolymer comprises copolymerizing acrylamide or methacrylamide and an ethenic monomer in an aromatic or alcoholic solvent and methylolating the resulting copolymer by reacting it with formaldehyde.

3. The process of claim 2 wherein the methylolated addition copolymer is alkylated by carrying out the copolymerization in an alkanol solvent.

4. The process of claim 3 in which preparing the methylolated addition copolymer comprises copolymerizing acrylamide or methacrylamide with an ethenic monomer having about 11–22 carbon atoms and a small amount of an alpha-beta unsaturated acid, said acrylamide or methacrylamide forming about 10–30 weight percent of the resulting copolymer and said alpha-beta unsaturated acid forming less than about 5 weight percent of the resulting copolymer.

5. The process of claim 4 in which the nonsolvent aliphatic liquid is an aliphatic naphtha having a distillation range of about 100–150° C. and comprising adding sufficient naphtha to the copolymer solution so the naphtha forms 90 weight percent of the liquid medium.

6. The process of claim 5 in which each of the ethenic monomers of the second addition copolymer has less than 12 carbon atoms.

7. The process of claim 1 wherein the methylolated addition copolymer is alkylated by reacting the copolymer with an alkanol prior to mixing the nonsolvent aliphatic liquid with the solution.

8. The process of claim 1 in which the ethenic monomer copolymerized with the amide has about 11–22 carbon atoms.

9. The process of claim 1 in which each of the ethenic monomers of the second addition copolymer has less than 12 carbon atoms.

References Cited

UNITED STATES PATENTS

| | | | |
|---|---|---|---|
| 3,557,048 | 1/1971 | Wilhelm et al. | 260—34.2 |
| 3,640,931 | 2/1972 | Clarke et al. | 260—34.2 |
| 3,365,414 | 1/1968 | Fisk et al. | 260—33.4 |
| 3,382,297 | 5/1968 | Thompson | 260—34.2 |
| 3,405,087 | 10/1968 | Fryd | 260—34.2 |
| 3,474,061 | 10/1969 | Von Bonin et al. | 260—34.2 |
| 3,632,789 | 1/1972 | Wilhelm et al. | 260—33.6 UB |

ALLAN LIEBERMAN, Primary Examiner

U.S. Cl. X.R.

260—33.4 EP, 33.6 R, 33.6 EP, 34.2